US012677815B2

(12) United States Patent
R et al.

(10) Patent No.: US 12,677,815 B2
(45) Date of Patent: Jul. 14, 2026

(54) DELIVERY SYSTEM EMBEDDED TRAP DEVICE FOR ATTRACTING FEMALE AND MALE FRUIT FLIES

(71) Applicant: Manoj Kumar R, Yelahanka (IN)

(72) Inventors: Manoj Kumar R, Yelahanka (IN); Vivek Kempraj, Srighandada Kavalu (IN); Vijeth V Arya, Srighandada Kavalu (IN)

(73) Assignee: Manoj Kumar R, Yelahanka (IN)

( * ) Notice: Subject to any disclaimer, the term of this patent is extended or adjusted under 35 U.S.C. 154(b) by 11 days.

(21) Appl. No.: 18/673,870

(22) Filed: May 24, 2024

(65) Prior Publication Data

US 2024/0306624 A1     Sep. 19, 2024

Related U.S. Application Data

(63) Continuation-in-part of application No. 17/758,527, filed as application No. PCT/IB2021/050698 on Jan. 29, 2021, now abandoned.

(30) Foreign Application Priority Data

Jan. 30, 2020    (IN) ............................. 202041004240

(51) Int. Cl.
A01M 1/02          (2006.01)
A01M 1/04          (2006.01)
A01M 1/10          (2006.01)
(52) U.S. Cl.
CPC ................. *A01M 1/02* (2013.01); *A01M 1/04* (2013.01); *A01M 1/106* (2013.01)

(58) Field of Classification Search
CPC ............ A01M 1/00; A01M 1/02; A01M 1/10; A01M 1/106; A01M 1/12; A01M 1/20; A01M 1/2005; A01M 1/2016; A01M 1/04
USPC ..... 43/107, 122, 131; 239/34, 37, 38, 42, 43
See application file for complete search history.

(56) References Cited

U.S. PATENT DOCUMENTS

| | | | | |
|---|---|---|---|---|
| 495,091 | A | * | 4/1893 | Jenisch .................... A01M 1/14 |
| | | | | 43/131 |
| 1,139,740 | A | * | 5/1915 | Van Dyne ................. A61L 9/12 |
| | | | | 239/43 |
| 1,944,375 | A | * | 1/1934 | Schneider ................. F24F 6/04 |
| | | | | 239/42 |
| 3,727,840 | A | * | 4/1973 | Nigro ...................... A61L 9/127 |
| | | | | 239/57 |

(Continued)

FOREIGN PATENT DOCUMENTS

| | | | | |
|---|---|---|---|---|
| CN | | 2359893 Y | * | 1/2000 |
| CN | | 103704186 A | * | 4/2014 |

(Continued)

OTHER PUBLICATIONS

International Search Report & Written Opinion dated Apr. 22, 2021 from PCT Application No. PCT/IB2021/050698, 8 pages.

*Primary Examiner* — Darren W Ark
(74) *Attorney, Agent, or Firm* — INNOVATION CAPITAL LAW; Vic Lin

(57)          ABSTRACT

A delivery system embedded trap device for attracting female and male fruit flies can attract both female and male of fruit flies for an extended period of typically at least 180 days, irrespective of the season, thereby effectively controlling the major pest in agriculture.

20 Claims, 11 Drawing Sheets

(56) References Cited

U.S. PATENT DOCUMENTS

| | | | | | |
|---|---|---|---|---|---|
| 4,551,941 | A | * | 11/1985 | Schneidmiller | A01M 1/04 43/107 |
| 4,662,103 | A | * | 5/1987 | Cheng | A01M 1/2044 43/132.1 |
| 5,766,617 | A | * | 6/1998 | Heath | A01N 33/04 424/407 |
| 5,810,253 | A | * | 9/1998 | Ohayon | A61L 9/12 239/58 |
| 5,839,221 | A | * | 11/1998 | Ron | A01M 1/14 43/132.1 |
| 5,907,923 | A | * | 6/1999 | Heath | A01N 33/04 43/107 |
| 5,921,443 | A | * | 7/1999 | McMillan | A01G 27/005 47/48.5 |
| 5,939,062 | A | * | 8/1999 | Heath | A01M 1/2016 424/408 |
| 6,340,120 | B1 | * | 1/2002 | Seymour | A61L 9/12 239/57 |
| 6,708,445 | B1 | * | 3/2004 | Israely | A01M 1/02 43/132.1 |
| 8,418,399 | B2 | * | 4/2013 | Palencia-Adrubau | A01M 1/106 43/107 |
| 2003/0049296 | A1 | * | 3/2003 | Knauf | A01M 1/02 43/107 |
| 2004/0128902 | A1 | * | 7/2004 | Kollars, Jr. | A01M 1/22 43/107 |
| 2005/0189434 | A1 | * | 9/2005 | Burgeson | A01M 31/008 239/37 |
| 2006/0289668 | A1 | * | 12/2006 | Szymczak | A01M 31/008 239/152 |
| 2007/0158456 | A1 | * | 7/2007 | Spector | A61L 9/127 239/34 |
| 2009/0000180 | A1 | * | 1/2009 | Palencia-Adrubau | A01N 25/34 43/131 |
| 2012/0061486 | A1 | * | 3/2012 | Atkinson | A01M 1/2044 239/34 |
| 2013/0075488 | A1 | * | 3/2013 | Palermo | A01M 29/06 239/34 |
| 2020/0383309 | A1 | * | 12/2020 | Reckhaus | A01M 1/02 |
| 2021/0276028 | A1 | * | 9/2021 | Perez | A61L 9/14 |
| 2023/0270105 | A1 | * | 8/2023 | Canale | A01P 19/00 43/107 |
| 2023/0337653 | A1 | * | 10/2023 | Fryers | A01M 1/02 |

FOREIGN PATENT DOCUMENTS

| | | | | | |
|---|---|---|---|---|---|
| CN | 104920321 | A | | 9/2015 | |
| CN | 106172313 | A | * | 12/2016 | A01M 1/14 |
| CN | 206150260 | U | * | 5/2017 | |
| CN | 108617612 | A | * | 10/2018 | A01M 1/106 |
| CN | 208739947 | U | * | 4/2019 | |
| CN | 208908926 | U | * | 5/2019 | |
| CN | 209473416 | U | * | 10/2019 | |
| CN | 210929271 | U | * | 7/2020 | |
| CN | 211832516 | U | * | 11/2020 | |
| CN | 212279555 | U | * | 1/2021 | |
| CN | 212993915 | U | * | 4/2021 | |
| CN | 213523539 | U | * | 6/2021 | |
| CN | 213587239 | U | * | 7/2021 | |
| CN | 213603923 | U | * | 7/2021 | |
| CN | 213756339 | U | * | 7/2021 | |
| CN | 213756349 | U | * | 7/2021 | |
| CN | 214629272 | U | * | 11/2021 | |
| CN | 214903238 | U | * | 11/2021 | |
| CN | 215012869 | U | * | 12/2021 | |
| CN | 215074900 | U | * | 12/2021 | |
| CN | 215188950 | U | * | 12/2021 | |
| CN | 215302503 | U | * | 12/2021 | |
| CN | 215380922 | U | * | 1/2022 | |
| CN | 215873167 | U | * | 2/2022 | |
| CN | 216135059 | U | * | 3/2022 | |
| CN | 216363272 | U | * | 4/2022 | |
| CN | 216533391 | U | * | 5/2022 | |
| CN | 216533392 | U | * | 5/2022 | |
| CN | 216674378 | U | * | 6/2022 | |
| CN | 216874651 | U | * | 7/2022 | |
| CN | 216931531 | U | * | 7/2022 | |
| CN | 216961221 | U | * | 7/2022 | |
| CN | 115005174 | A | * | 9/2022 | A01M 1/04 |
| CN | 217429050 | U | * | 9/2022 | |
| CN | 217547061 | U | * | 10/2022 | |
| CN | 217609094 | U | * | 10/2022 | |
| CN | 217609099 | U | * | 10/2022 | |
| CN | 217644475 | U | * | 10/2022 | |
| CN | 217657812 | U | * | 10/2022 | |
| DE | 202020002111 | U1 | * | 6/2020 | A01M 1/106 |
| EP | 3772278 | A1 | * | 2/2021 | A01M 1/2044 |
| GB | 2481631 | A | * | 1/2012 | A61L 9/14 |
| GB | 2492160 | A | * | 12/2012 | A61L 9/127 |
| KR | 101458378 | B1 | | 11/2014 | |
| KR | 101703167 | B1 | | 2/2017 | |
| MX | 2014001788 | A1 | * | 8/2015 | |
| WO | WO-03099343 | A1 | * | 12/2003 | A61L 9/12 |
| WO | WO-2014109247 | A1 | * | 7/2014 | A01M 1/106 |
| WO | WO-2017015702 | A1 | * | 2/2017 | A01M 1/14 |
| WO | WO-2018185747 | A1 | * | 10/2018 | A01M 1/2022 |

* cited by examiner

1

DELIVERY SYSTEM EMBEDDED TRAP DEVICE FOR ATTRACTING FEMALE AND MALE FRUIT FLIES

CROSS-REFERENCE TO RELATED APPLICATIONS

This application is a continuation-in-part of U.S. patent application Ser. No. 17/758,527, filed Jul. 8, 2022, which claims the benefit of priority to India patent Application No. IN 202041004240 filed on Jan. 30, 2020, the full disclosures of each of which are hereby incorporated by reference.

BACKGROUND OF THE INVENTION

1. Field of the Invention

Embodiments of the invention relate generally to a delivery system embedded trap device, in particular to a trap device for extended and controlled release of lure attracting female and male fruit flies.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Insect traps are vastly used both for monitoring and reducing the population of fruit flies. They typically use food, visual lures, chemical attractants and pheromones as bait and are installed so that they do not injure other animals or humans or result in residues in foods or feeds. Visual lures use light, bright colors and shapes to attract pests. Chemical attractants or pheromones may attract only a specific sex. Insect traps are used in pest management programs instead of pesticides but are more often used to look at seasonal and distributional patterns of pest occurrence. This information may then be used in other pest management approaches.

Flies are occasionally attracted by proteins. Many other insects are attracted by bright colors, carbon dioxide, lactic acid, floral or fruity fragrances, warmth, moisture and pheromones.

In case of the existing trapping technologies, the effect of lure will be reduced over a period of time, in which the attraction becomes nil over few days i.e., within 20-30 days. Hence the farmer needs to replace the lures at least thrice in one season.

Accordingly, there is a need for an insect trapping device that, among other advantages, avoids replacing the lure for the whole season.

SUMMARY OF THE INVENTION

One object of the invention is to develop a delivery system embedded trap device for attracting female and male fruit flies.

Another object of the invention is to provide a method of luring, trapping and killing insects or flies, specifically male and female flies such as fruit flies at all stages, using the instant inventive delivery system embedded trap device.

Aspects of the present invention discloses a delivery system embedded trap device for attracting female and male fruit flies. The device comprises Lure Reservoir, Control Release Knob, Connector or Spacing Adjustor, Circular-Pyramid, Sphere-Shaped Insect Attractant, Top Cover, and Bottom Cover. The device delivers the lure formulation in a controlled and extended way for a period of 180 days to attract the fruit files in one season, thus making it last for a long period.

In another aspect, the invention relates to a method of luring, trapping and killing insect or flies, specifically male and female flies such as fruit flies at all stages using the present invention trap device.

Embodiments of the present invention provide a delivery system embedded trap device comprising a top cover and a bottom cover collectively forming an outer shape of the delivery system embedded trap device, the top cover and the bottom cover defining an interior space; one or more openings formed in at least one of the top cover or the bottom cover, the one or more openings providing access to the interior space; a lure reservoir attached to an opening in the top of the top cover, the lure reservoir configured to hold a lure or attractant formulation; a control release knob connected to the lure reservoir for releasing an amount of the lure or attractant formulation from the lure reservoir; and a sphere-shaped insect attractant disposed below the control release knob, the sphere-shaped insect attractant operable to receive the lure or attractant formulation from the control release knob to coat an outer surface of the sphere-shaped insect attractant with the lure or attractant formulation.

Embodiments of the present invention provide a delivery system embedded trap device comprising a top cover and a bottom cover collectively forming an outer shape of the delivery system embedded trap device, the top cover and the bottom cover defining an interior space; one or more openings formed in at least one of the top cover or the bottom cover, the one or more openings providing access to the interior space; a lure reservoir attached to an opening in the top of the top cover, the lure reservoir configured to hold a lure or attractant formulation; a control release knob connected to the lure reservoir for releasing an amount of the lure or attractant formulation from the lure reservoir; a spacing adjuster extending downward, at a proximate end thereof, from the opening in the top cover to provide an open interior space through which the lure or attractant formulation released from the control release knob moves; a circular-pyramid disposed at a distal end of the spacing adjuster, the circular-pyramid configured to receive the amount of the lure or attractant formulation released via the control release knob; and a sphere-shaped insect attractant connected to the circular-pyramid and to the distal end of the spacing adjuster, the sphere-shaped insect attractant centrally disposed within the interior space.

Embodiments of the present invention provide a method for attracting and trapping of insects or flies using the delivery system embedded trap device described herein, comprising steps of placing the lure or attractant formulation in the lure reservoir; adjusting the control release knob for releasing the amount of the lure or attractant formulation onto the outer surface of the sphere-shaped insect attractant; and collecting trapped, collected and dead insects or flies by removing the bottom cover from the top cover.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
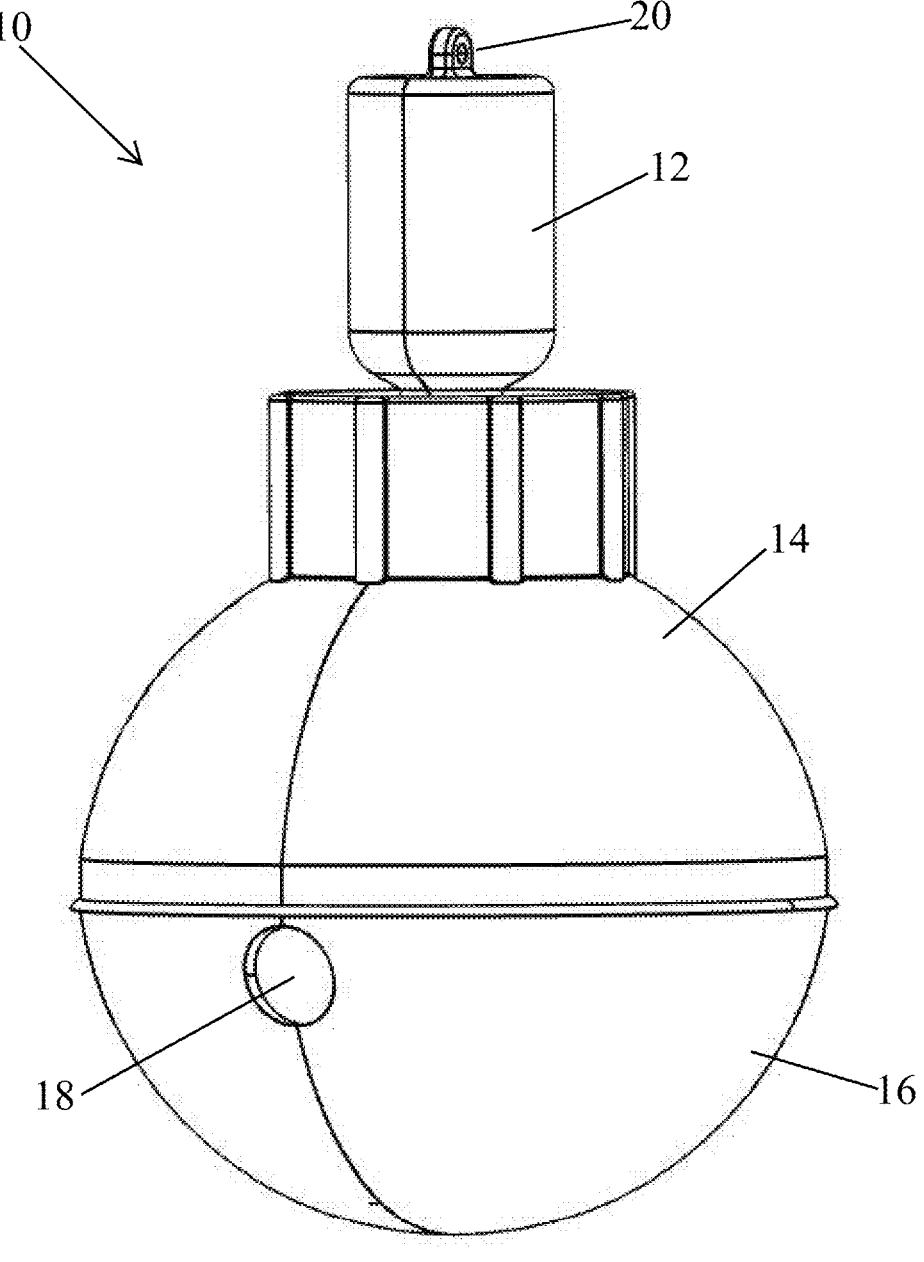
FIG. 1 illustrates a side view of a delivery system embedded trap device according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a delivery system embedded trap device for attracting female and male fruit flies which can attract both female and male of fruit flies for an extended period of typically at least 180 days, irrespective of the season, thereby effectively controlling the major pest in agriculture.

The trap design according to the present disclosure is to attract both female and male fruit flies for extended period up to 6 months, for example. A significant number of lab and field trials were conducted to examine the potential of a trap for attracting males and females fruit flies. From these trials, it was concluded that the trap, according to aspects of the present invention, as described below, attracts a large number of male (1400 per trap) and females (1550 per trap) of any species.

The trap device, according to aspects of the present invention, can be used to target any species of fruit flies, both male and female, and mostly gravid females (proven in lab and field studies). The trapping of fruit flies for extended periods of time in field conditions, irrespective of the season, decreased the future generations of fruit flies on a long run, thereby, linking the potential of present invention trapping system in integrated pest management (IPM), fruit fly control and eradication programs. The trapping technology is environmentally friendly without any inclusion of toxic insecticide, making the present invention/application technology robust. The present device is a cost effective, long lasting (up to at least 3 month/trap) and provides an eco-friendly technique of trapping male and female fruit flies for IPM in vegetable and fruit orchards. By installing 8-10 traps per acre (as per studies conducted) both male and female fruit flies can be effectively monitored and trapped.

The novel delivery system embedded trap design can be filled with phagostimulants blend of any known formulation that attracts both male and female fruit flies.

The described technology is cost effective and traps more of females which are the main cause of fruit destruction. The extended release method of the present application device/trap is more effective in cases where farmers delay or forget to replace lures, which might cause severe damage to the crop. In this case, the present device/trap helps more effectively, as there is no need for the farmer to replace the lure in one crop season.

The following are illustrative embodiments referring to illustrative drawings, The following and the drawings in no way should be interpreted as to limit the shape of the components and the arrangements in the device.

In an aspect, the invention provides a delivery system embedded trap device 10 for attracting female and male fruit flies, the device referring to non-limiting illustrative FIGS. 1 through 15.

In a non-limiting embodiment, the delivery system embedded trap device 10 (also referred to simply as device 10) is provided with a lure reservoir 12 which holds lure or attractant formulation in fluid form or semi fluid form. The lure reservoir 12 is closed and configured with an opening 24, so as to not allow the whole lure to be exposed to atmosphere at the same time. Hence the consistency of attraction of the device stays until the lure reservoir 12 is emptied. A hanging mount 20 may be disposed at a top side of the lure reservoir 12, opposite the opening 24, for hanging the device 10.

The device 10 can include a control release knob 22, which is removably connected to the lure reservoir 12 and is provided in such a way, that only a particular amount of lure or attractant is released at any point of time. The control release knob 22, which is shown in detail in FIGS. 11A-11C, can include a dropper tip 26 to provide a controlled release of the lure or attractant from the lure reservoir 12. The control release knob 22 can further include a hole 48 formed there through, where, when the control release knob 22 is placed in the opening 24 of the lure reservoir 12, the lure or attractant can flow through the hole 48 and out of the dropper tip 26. The dropper tip 26 can be configured with a mechanism 66 for adjusting the release rate, controlling the release rate thereby increasing or decreasing the release rate of lure or attractant. For example, the dropper tip 26 may be rotatable to control the size of the hole 48, thus regulating the flow of the lure or attractant through the control release knob 22. Various mechanisms may be used, such as a rotation-adjustable aperture, a deformable ring disposed on the dropper tip 26 that can be squeezed to restrict flow through the hole 48, or the like.

Figure 2:
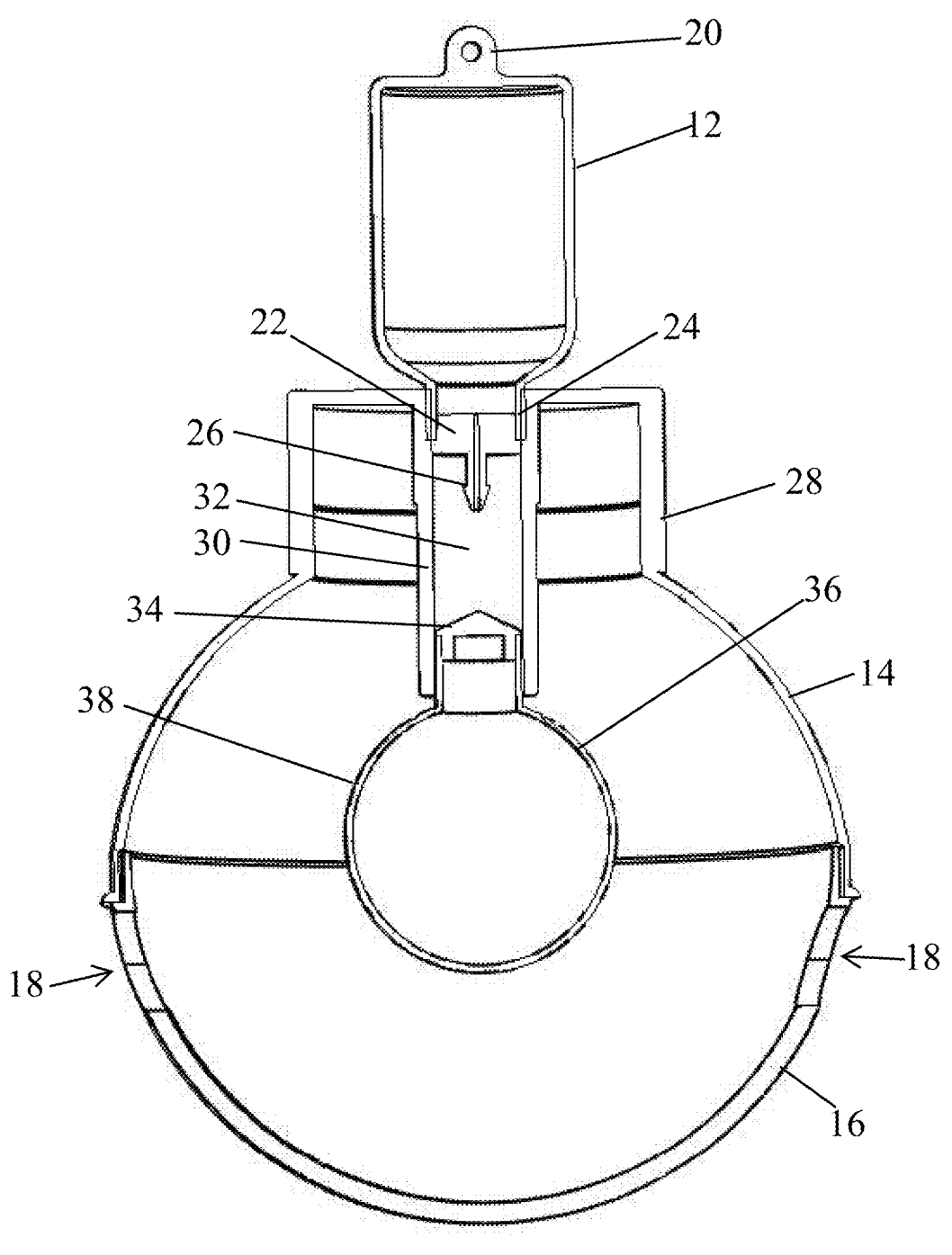
FIG. 2 illustrates a side cross-sectional view of the delivery system embedded trap device of FIG. 1.
Figure 3:
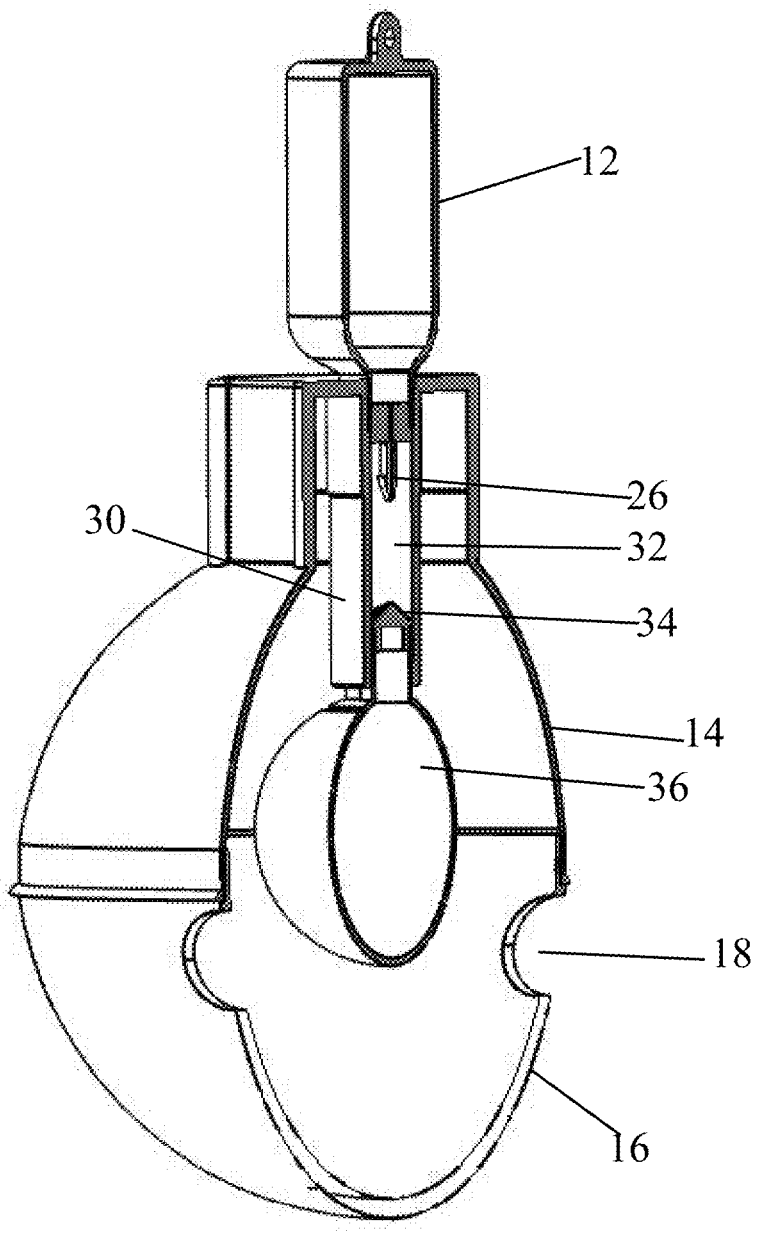
FIG. 3 illustrates a perspective cross-sectional view of the delivery system embedded trap device of FIG. 1.
Figure 4:
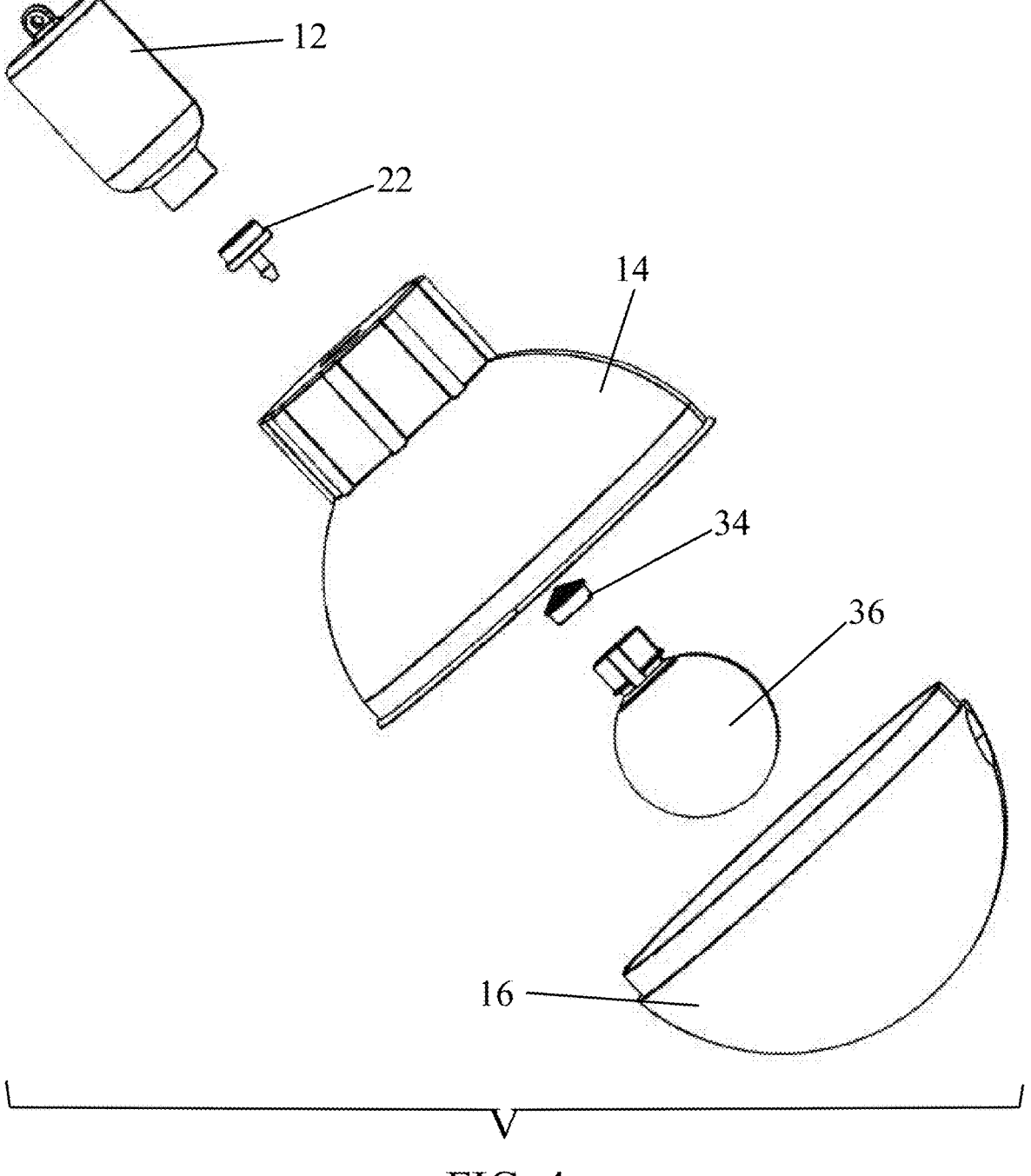
FIG. 4 illustrates a side exploded view of the delivery system embedded trap device of FIG. 1.
Figure 5:
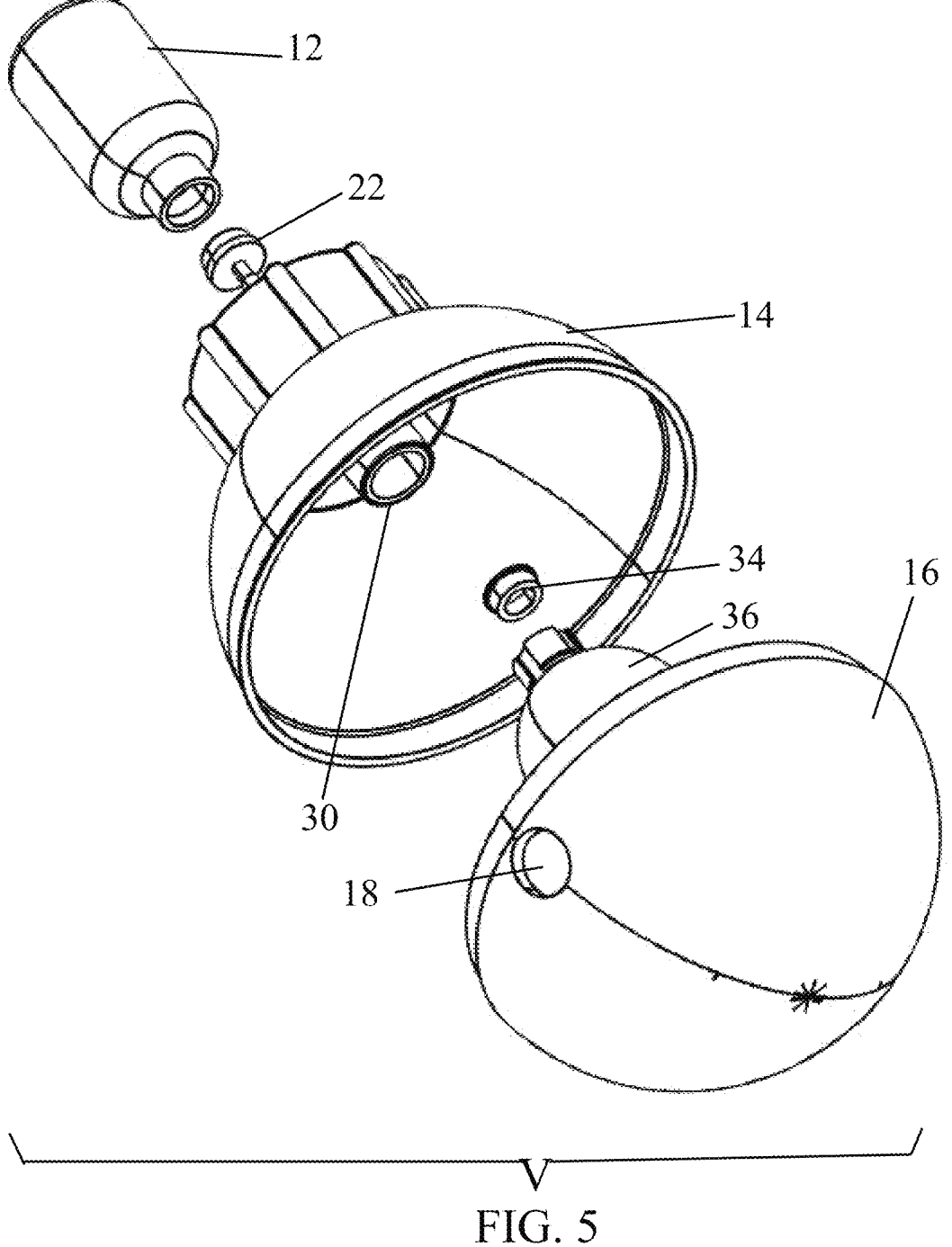
FIG. 5 illustrates a bottom exploded view of the delivery system embedded trap device of FIG. 1.
Figure 6:
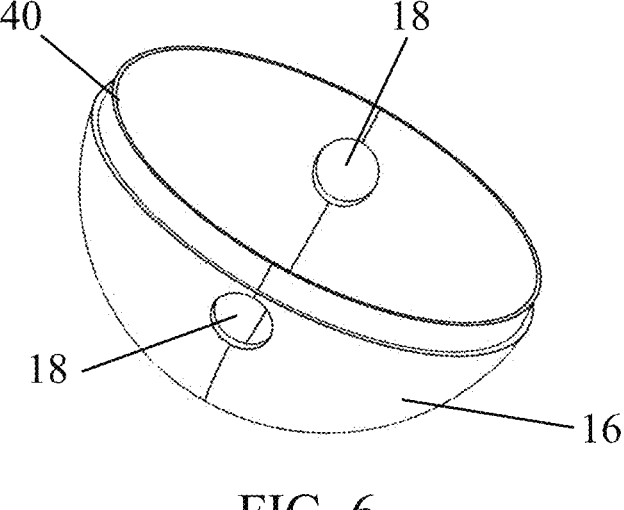
FIG. 6 illustrates a perspective view of a bottom cover of the delivery system embedded trap device of FIG. 1.
Figure 7:
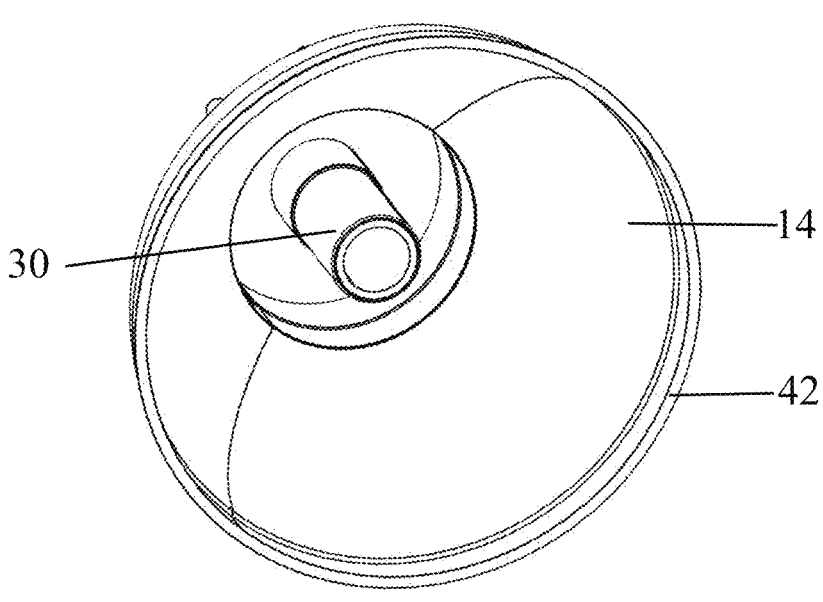
FIG. 7 illustrates a bottom perspective view of a top cover of the delivery system embedded trap device of FIG. 1.
Figure 8:
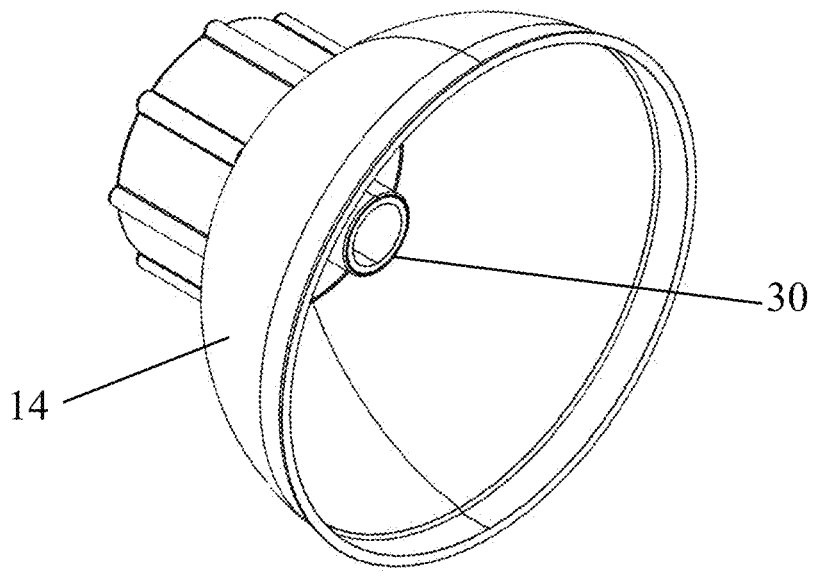
FIG. 8 illustrates a side perspective view of the top cover of FIG. 7.
Figure 9:
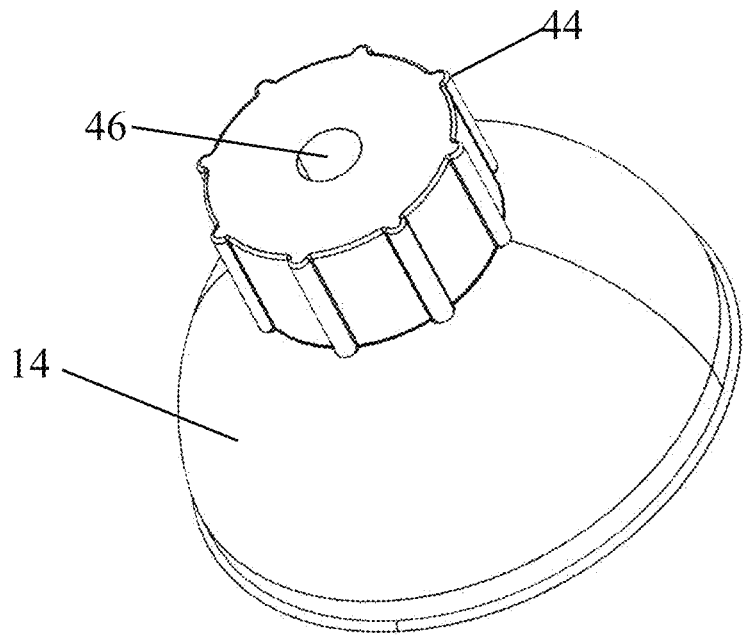
FIG. 9 illustrates a top perspective view of the top cover of FIG. 7.
Figure 10A:
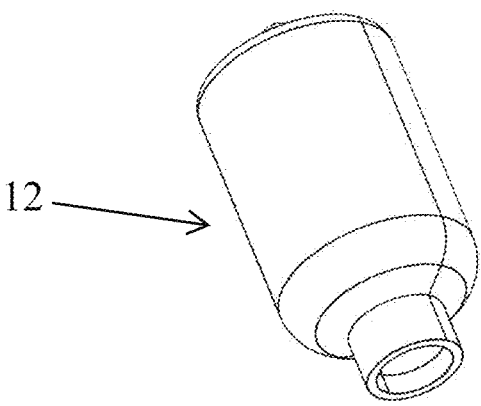
FIGS. 10A-10C illustrate perspective, side and top views of a lure reservoir of the delivery system embedded trap device of FIG. 1.
Figure 10B:
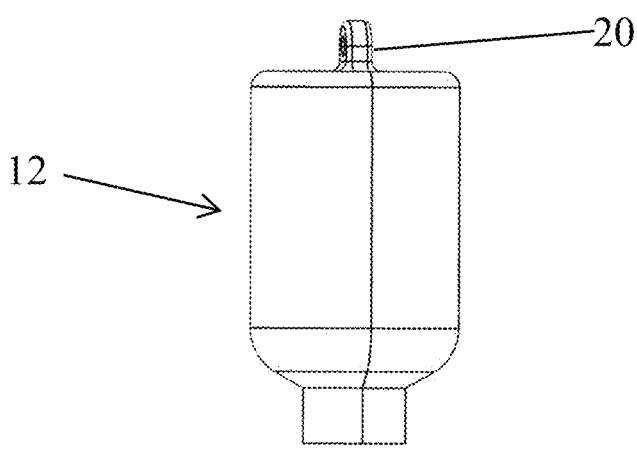
Figure 10C:
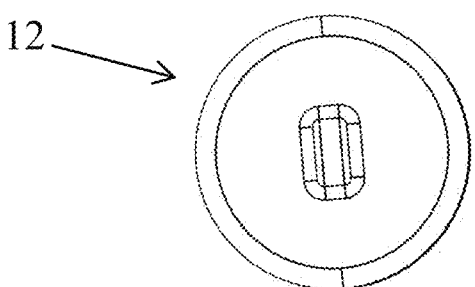
Figure 11A:
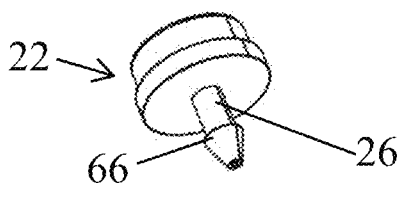
FIGS. 11A-11C illustrate perspective, side and top views of a control release knob of the delivery system embedded trap device of FIG. 1.
Figure 11B:
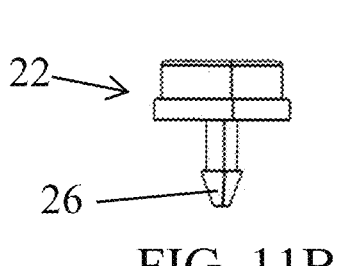
Figure 11C:
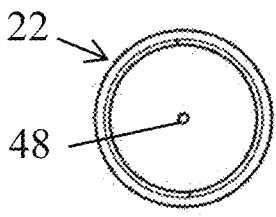

The device 10 can further include a connector 30 (also referred to as a spacing adjustor 30) below the lure reservoir. The spacing adjuster 30 can be formed integrally with a top cover 14 of the device, as described below. The lure reservoir 12 may be received in top opening or hole 46 in the top cover 14 (see FIG. 9) and may be surrounded by the spacing adjuster 30, that can extend downward into the top cover 14. The spacing adjuster 30 can provide a connection between the lure reservoir 12 and a sphere-shaped insect attractant 36. A bottom open end of the spacing adjuster 30 can receive the insect attractant 36 therein. A length of the spacing adjuster 30 can be configured so that the insect attractant 36 is disposed in a central region on an interior of the device 10. Thus, a longer spacing adjuster 30 may be used when the outside of the top cover 14 and bottom cover 16 of the device 10 is larger, thus providing the insect attractant 36 in a central region of the device 10, regardless of the overall size. As used herein, the central region may be at a concentric center of the interior of the device 10, or may be located equidistant from each side, but closer to a top of the interior of the device, as shown in FIG. 2, for example, or may be located at an location where the outer surface of the insect attractant 36 is spaced apart from an inside surface of the top cover 14 and the bottom cover 16.

Figure 12A:
FIGS. 12A-12C illustrate perspective, side and top views of a circular pyramid of the delivery system embedded trap device of FIG. 1.
Figure 12B:
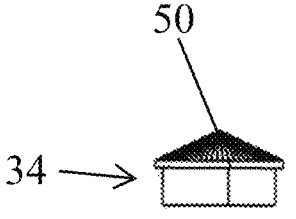
Figure 12C:
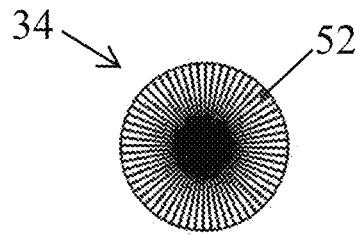

The device 10 can include a circular-pyramid 34 between the spacing adjustor 30 and the insect attractant 36. The circular-pyramid 34 can be installed in an opening 64 at the top of the insect attractant 36 and can be placed directly under (at 180 degrees under) the dropper tip 26 so that the lure or attractant can drop from the dropper tip 26, move through the interior 32 of the spacing adjuster 30 and impinge on the peak 50 of the circular-pyramid 34 (see FIG. 12B). The circular-pyramid 34 is provided for letting the released fluid spread evenly on all sides of the insect attractant 36. For example, channels 52 may be uniformly provided from the peak 50 of the circular-pyramid 34 to the outer edge thereof, as shown in FIG. 12C. Thus, when fluid impinges on the peak 50, it can uniformly flow down the channels 52 to the outer edge of the circular-pyramid 34.

The sphere-shaped insect attractant 36 is connected to the lure reservoir 12 via the spacing adjuster 30 and the circular-pyramid 34. The insect attractant 36 provides various functions. The functions includes providing large surface area 38 for the attractant/lure to spread over, which in turn gives more area for the insects to come over and get trapped; delaying the exhaust of the lure, which provides more time for the attractant to work; and the insect attractant 36 may be made of deep yellow color or any color which can visually attract insects/flies, thus acting as a visual attractant for insects/flies such as fruit flies.

Figure 13:
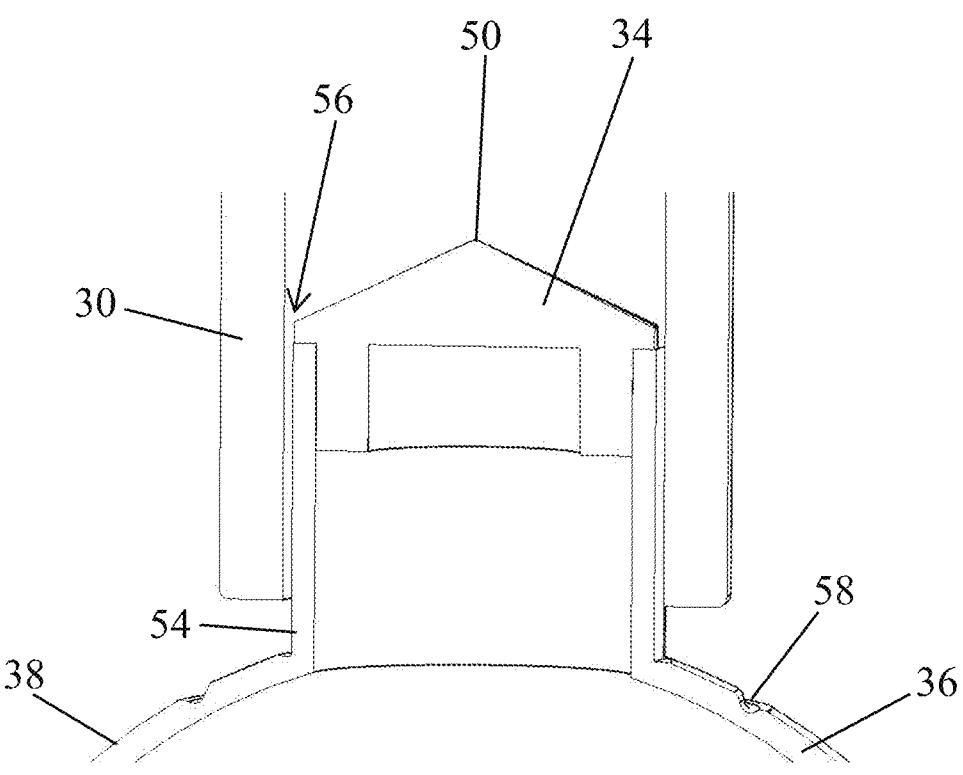
FIG. 13 illustrates a detailed cross sectional view illustrating a sphere-shaped insect attractant attached to a spacing adjuster of the top cover of the delivery system embedded trap device of FIG. 1.
Figure 14:
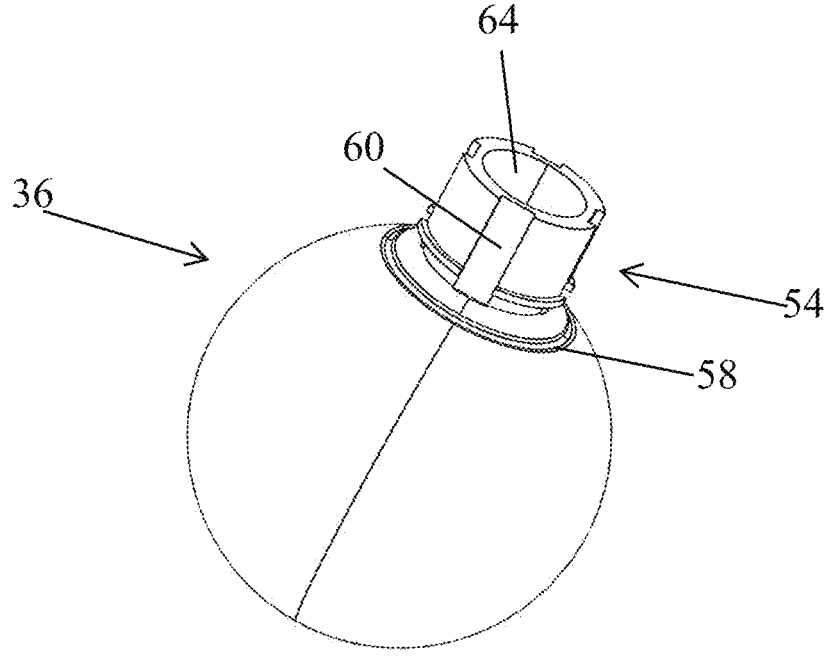
FIG. 14 illustrates a perspective view of the sphere-shaped insect attractant of the delivery system embedded trap device of FIG. 1.
Figure 15:
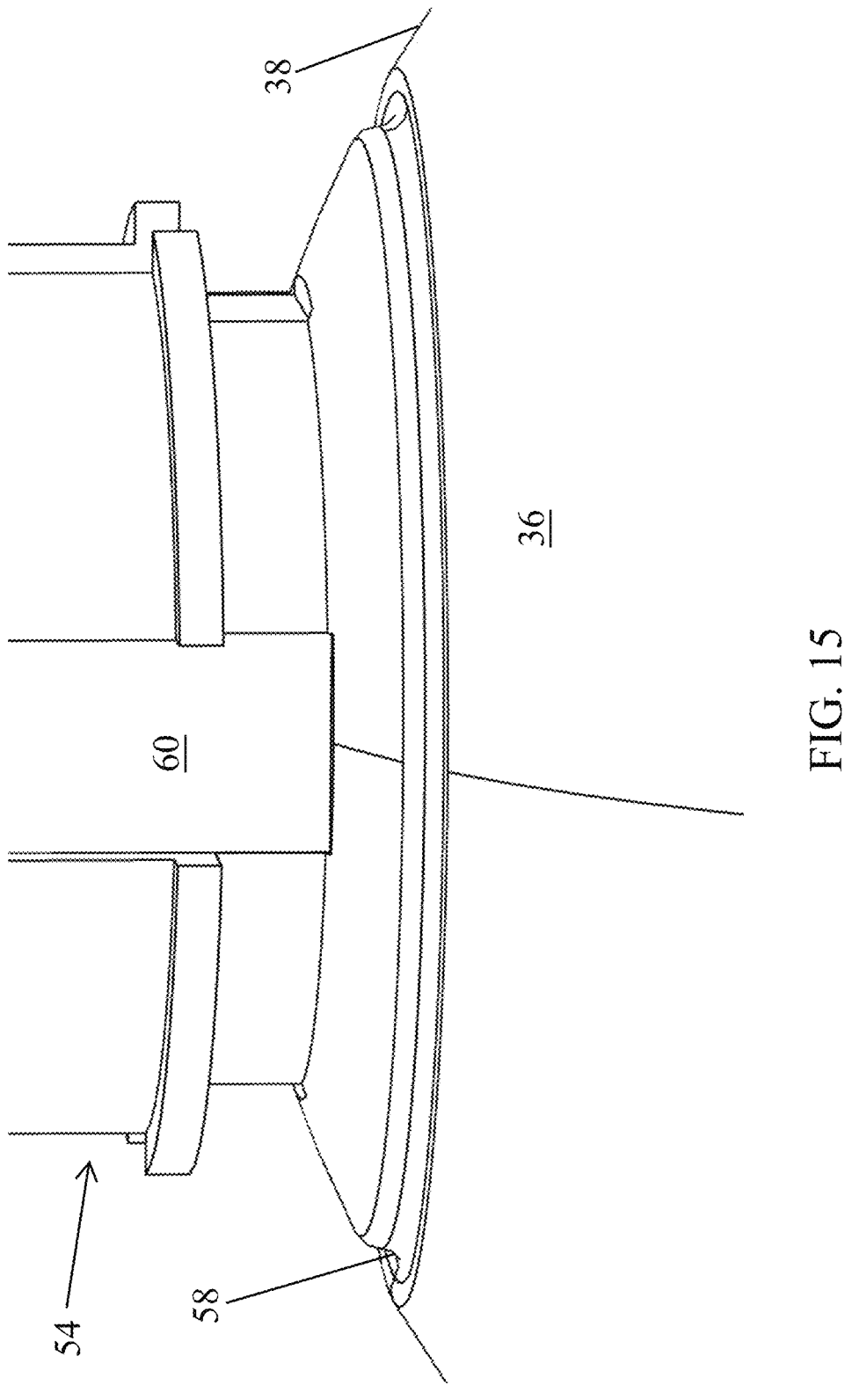
FIG. 15 illustrates a detailed side view of the sphere-shaped insect attractant of the delivery system embedded trap device of FIG. 1.

As shown in FIGS. 13 through 15, the circular pyramid 34 can fit into the opening 64 of the insect attractant 36. The outer edge of the circular-pyramid 34 can be disposed directly adjacent to the outer periphery of the opening 64. Thus, fluid (insect 15 lure or attractant) that flows down the circular-pyramid 34 can move to the top of the opening 64. Gaps 56 can be provided between the neck 54 of the insect attractant 36 (which defines the opening 64) and the inside surface of the spacing adjuster 30. Thus, fluid can flow from the top of the opening 64, through the gaps 56 and onto the outer surface 38 of the insect attractant 36. The gaps 56 can be formed from a plurality of channels 60 formed in the neck 54 of the insect attractant 36, as best seen in FIG. 14.

The insect attractant 36 can include a circular groove 58 formed about the outer surface 38 thereof adjacent to where the neck 54 meets the sphere shape of the insect attractant 36. In other words, the groove 58 may be formed near a top of the sphere shape of the insect attractant 36 and may extend an entire distance around the outer surface 38 at a uniform distance away from the neck 54. The groove 58 can collect the lure or attractant that moves through the gaps 56, defined by the channels 60, and can help ensure the lure or attractant moves over most or all of the outer surface 38 of the insect attractant 36.

The device 10 can be provided with a top cover 14 which covers the spacing adjustor 30, the circular-pyramid 34, and protects the insect attractant 36 from adverse weather conditions such as wind, sun light and rain. Hence the fluid lure will last longer in the sphere, thereby increasing the luring or attracting capacity.

The device 10 can be provided with removable bottom cover 16, which is connected below the top cover 14 by means of a screw arrangement 40, 42, for example; the bottom cover 16 can be removed for discarding the trapped, collected and dead flies/insects. Further, the bottom cover 16 is provided with two openings 18, on opposite sides thereof, for allowing the entry of insects/flies in to the device 10.

In an exemplary embodiment, the bottom cover 16 is made of deep yellow color, thereby acting as a visual attractant, so the flies enter the openings 18 of the bottom cover 16. While two openings 18 are shown, a single opening, or more than two openings may be provided. Further, the size of the openings 18 are not to any particular scale and may be adjusted according to user needs. While the openings 18 are shown in the bottom cover 16, it should be understood that the openings 18 may be only in the top cover 14 or may be in both the top and bottom covers 14, 16.

In an exemplary embodiment, all the components are to be made from polypropylene virgin plastic or any such suitable material.

In some embodiments, as shown in the Figures, the top cover 14 and the bottom cover 16 may form a spherical shape, where a neck 28 of the top cover 14 can extend upwards. The neck 28 may include grips 44 to help a user grip the top cover 14 when placing the lure reservoir 12 into the hole or opening 46 provided at the top of the neck 28 or when removing the bottom cover 16.

The another aspect of the invention provides a method for attracting and trapping of insects or flies using the delivery system embedded trap device 10, the method comprises: placing formulation in the lure reservoir; adjusting the control release knob for releasing appropriate amount of lure in to sphere-shaped insect attractant via the connector or spacing adjustor, which delays the time of flow of fluid lure and circular-pyramid which spreads the lure across the surface area of the sphere-shaped insect attractant.

The device according to the present disclosure delivers the formulation at a slow rate for a period of up to 180 days to attract the flies in one season.

During field trails, it was observed that an average catching of about 80 number of fruit flies are caught per the present device in highly infested fields, whereas about 30 flies were caught in moderately infested fields.

The device is cost-effective, eco-friendly used to monitor and eradicate fruit fly's population by trapping, a reusable trap design, attracts male and female flies of all stages with no use of insecticides or toxicants and highly recyclable.

These above features makes this invention unique, as it overcomes the problems being faced by farmers in existing trap models, i.e., to replace the lure in one season itself, whereas in the present application device/trap there is no need to replace lure in one whole season. This reduces the labor cost of the farmers to replace lures. This will take more market advantage as many farmers forget/delay to replace lures in traps, where the fruit fly damage increases in such cases even after using one trap in a season. But in this case there is no need for the farmer to revisit the field to replace the lure as it works for longer duration and also works consistently and more efficiently.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A delivery system embedded trap device comprising:
   a top cover and a bottom cover operatively connect to each other to form a spherical shape collectively forming an outer shape of the delivery system embedded trap device, the top cover and the bottom cover defining an interior space;
   one or more first openings formed in at least one of the top cover or the bottom cover, the one or more first openings providing access to the interior space;
   a lure reservoir attached to a second opening in a top of the top cover, the lure reservoir configured to hold a lure or attractant formulation;
   a control release knob connected to the lure reservoir for releasing an amount of the lure or attractant formulation from the lure reservoir;

a spacing adjuster extending downward, at a proximate end thereof, from the second opening in the top cover that receives the lure reservoir, to provide an open interior space through which the lure or attractant formulation released from the control release knob moves; and a circular-pyramid disposed at a distal end of the spacing adjuster; and a sphere-shaped insect attractant connected to the circular pyramid and to the distal end of the spacing adjuster, the sphere-shaped insect attractant disposed below the control release knob.

2. The delivery system embedded trap device of claim 1, wherein the top cover includes a neck member.

3. The delivery system embedded trap device of claim 1, wherein the circular-pyramid is configured to receive the amount of the lure or attractant formulation released via the control release knob and provide the lure or attractant formulation to an outer surface of the sphere-shaped insect attractant.

4. A delivery system embedded trap device comprising:

a top cover and a bottom cover operatively connect to each other to form a spherical shape of the delivery system embedded trap device, the top cover and the bottom cover defining an interior space;

one or more first openings formed in at least one of the top cover or the bottom cover, the one or more first openings providing access to the interior space;

a lure reservoir attached to a second opening in a top of the top cover, the lure reservoir configured to hold a lure or attractant formulation;

a control release knob connected to the lure reservoir for releasing an amount of the lure or attractant formulation from the lure reservoir;

a spacing adjuster extending downward, at a proximate end thereof, from the second opening in the top of the cover to provide an open interior space through which the lure or attractant formulation released from the control release knob moves;

a circular-pyramid disposed at a distal end of the spacing adjuster, the circular-pyramid configured to receive the amount of the lure or attractant formulation released via the control release knob; and a sphere-shaped insect attractant connected to the circular-pyramid and to the distal end of the spacing adjuster, the sphere-shaped insect attractant centrally disposed within the interior space.

5. The delivery system embedded trap device of claim 4, wherein the control release knob is a mechanism for adjusting a release rate of the lure or attractant formulation from the lure reservoir.

6. The delivery system embedded trap device of claim 4, wherein the spacing adjustor has a length to provide a spacing between the control release knob and the circular-pyramid, wherein the length controls a speed at which the amount of the lure or attractant formulation moves from the lure reservoir to the circular-pyramid.

7. The delivery system embedded trap device of claim 4, wherein the sphere-shaped insect attractant has a spherical outer surface area for the lure or attractant formulation to spread over, delaying exhaustion of the lure or attractant formulation.

8. The delivery system embedded trap device of claim 4, wherein the sphere-shaped insect attractant is made of deep yellow color for visually attracting insects or flies.

9. The delivery system embedded trap device of claim 4, wherein the bottom cover is made of deep yellow color, for visually attracting insects or flies to enter through the one or more first openings.

10. The delivery system embedded trap device of claim 4, wherein a neck of the sphere-shaped insect attractant includes channels that permits the lure or attractant formulation to flow from a top end of the neck to an outer spherical shape of the spherical shaped insect attractant.

11. The delivery system embedded trap device of claim 4, wherein the circular-pyramid includes a peak disposed directly below the control release knob such that the lure or attractant formulation released from the control release knob impinges on the peak.

12. The delivery system embedded trap device of claim 4, wherein the sphere-shaped insect attractant includes a circular groove cut into an outer surface thereof, the circular groove located equidistantly from a neck of the sphere-shaped insect attractant.

13. The delivery system embedded trap device of claim 4, wherein the spacing adjuster is formed integrally with the top cover.

14. The delivery system embedded trap device of claim 4, wherein the bottom cover is removable from the top cover to provide access to the interior space.

15. The delivery system embedded trap device of claim 4, wherein the sphere-shaped insect attractant comprises a neck, the neck and the spacing adjuster are separated by a gap.

16. The delivery system embedded trap device of claim 15, wherein the neck fits inside the distal end of the spacing adjuster.

17. A method for attracting and trapping of insects or flies using a delivery system embedded trap device, comprising steps of:

providing the delivery system embedded trap device of claim 4;

placing the lure or attractant formulation in the lure reservoir;

adjusting the control release knob for releasing the amount of the lure or attractant formulation onto the outer surface of the sphere-shaped insect attractant; and collecting trapped, collected and dead insects or flies by removing the bottom cover from the top cover.

18. The method according to claim 17, further comprising providing the lure or attractant formulation over a surface area of the sphere-shaped insect attractant over a period of time.

19. The method according to claim 18, wherein the period of time is 180 days.

20. The method according to claim 17, wherein the sphere-shaped insect attractant is made of a deep yellow color for visually attracting the insects/flies.

* * * * *